(12) United States Patent
Rubchinsky

(10) Patent No.: US 9,619,520 B2
(45) Date of Patent: Apr. 11, 2017

(54) METHOD AND SYSTEM FOR EVALUATING AND SHARING MEDIA

(75) Inventor: Konstantin A Rubchinsky, New York, NY (US)

(73) Assignee: papalove productions, LLC, New York, NY (US)

( * ) Notice: Subject to any disclaimer, the term of this patent is extended or adjusted under 35 U.S.C. 154(b) by 702 days.

(21) Appl. No.: 13/537,857

(22) Filed: Jun. 29, 2012

(65) Prior Publication Data

US 2014/0006415 A1    Jan. 2, 2014

(51) Int. Cl.
*G06F 7/00*     (2006.01)
*G06F 17/30*    (2006.01)

(52) U.S. Cl.
CPC .... *G06F 17/3053* (2013.01); *G06F 17/30648* (2013.01); *G06F 17/30864* (2013.01)

(58) Field of Classification Search
CPC ......... G06F 17/30949; G06F 17/30067; G06F 17/30516; G06F 17/3053; G06F 17/30648; G06F 17/30864
USPC .......................... 707/748, 726, 735, 999.002
See application file for complete search history.

(56) References Cited

U.S. PATENT DOCUMENTS

| | | | |
|---|---|---|---|
| 7,162,433 B1 * | 1/2007 | Foroutan | G06Q 10/063114 705/12 |
| 8,162,758 B1 * | 4/2012 | Powers | H04N 21/2743 463/42 |
| 2005/0210530 A1 * | 9/2005 | Horvitz et al. | 725/134 |
| 2007/0244585 A1 * | 10/2007 | Speiser | A63F 13/12 700/91 |
| 2008/0059891 A1 * | 3/2008 | Herzog | G06Q 30/02 715/751 |
| 2008/0071784 A1 * | 3/2008 | Hertzog | G06Q 30/02 |
| 2008/0126303 A1 * | 5/2008 | Park et al. | 707/3 |
| 2008/0189272 A1 * | 8/2008 | Powers | G06F 17/30817 |
| 2011/0022602 A1 * | 1/2011 | Luo et al. | 707/748 |
| 2011/0208822 A1 * | 8/2011 | Rathod | 709/206 |
| 2012/0197651 A1 * | 8/2012 | Robinson | G06Q 30/02 705/1.1 |
| 2013/0317891 A1 * | 11/2013 | Grigorash | G07C 13/00 705/12 |

* cited by examiner

*Primary Examiner* — Mohammed R Uddin
(74) *Attorney, Agent, or Firm* — Orrick, Herrington & Sutcliffe LLP

(57) ABSTRACT

A method and system for evaluating and sharing user-generated media files have been disclosed. The method and system is embodied in a contest/festival that entices visitors to return to the site to vote on their favorite videos by providing a plurality of phases in which the best performing media files are promoted based on voting scores. According to one embodiment, a computer implemented method comprises generating scores for each media file in four phases and calculating the total score for each of the four phases. The scores are calculated based on the number of views and votes from users for each media file. The votes are generated using questions, percentage of video viewed, comments, social distribution, and recommendations.

3 Claims, 13 Drawing Sheets

Creative Questions and Ratings scale:

1. Authenticity – Did you see an honest expression of feeling?
a. Superficial...Emotionally engaging 2. Passion – Were you inspired?
a. Indifferent...Moved 3. Thoughtfulness – Did it make you think?
a. Huh?... Thought Provoking 4. Creativity – Was it unique?
a. Day Old... Fresh Baked 5. Rhythm – Was your attention maintained throughout?
a. Snoozed... Cruised Tech Questions and Ratings scale:

1. Production Quality – How was the general "look" of the film?
a. Needs work...Outstanding 2. Editing – Were the edits seamlessly made?
a. Jarring...Like butter 3. Cinematography – Where the visual elements composed?
a. Overlooked...Picture Perfect 4. Sound Quality – Were the sound effects and dialogue clear?
a. Flawless... Not at all 5. Music – Did the music support the video?
a. Incongruent...Inspired

METHOD AND SYSTEM FOR EVALUATING AND SHARING MEDIA

TECHNICAL FIELD

The field of the invention relates generally to computer systems and more particularly relates to a method and system for evaluating and sharing media.

BACKGROUND

Media files, including video, audio, and video/audio files can be shared and viewed by users on the internet, using internet websites. Users typically use a networked computer and media software to view media files. Examples of media sharing websites that are popular today include Youtube, YAHOO!, Vimeo, Hulu, and Google. In a graphical display, a media sharing website provides windows through which a user can view media. Users may organize media files viewed into different groups based on their preferences.

Many of the media files shared and viewed by users on the internet are generated by users and there is significant disparity in the quality and popularity among them. There is not a systematic and logical method to evaluate the media files and award those with high quality.

SUMMARY

A method and system for evaluating and sharing user-generated media files have been disclosed. The method and system is embodied in a contest/festival that entices visitors to return to the site to vote on their favorite videos by providing a plurality of phases in which the best performing media files are promoted based on voting scores. According to one embodiment, a computer implemented method comprises generating scores for each media file in four phases and calculating the total score for each of the four phases. The scores are calculated based on the number of views and votes from users for each media file. The votes are generated using questions, percentage of video viewed, comments, social distribution, and recommendations.

The above and other preferred features, including various novel details of implementation and combination of elements, will now be more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the teachings herein.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

FIG. 12 illustrates an exemplary question set on a media file for users to answer according to one embodiment.

DETAILED DESCRIPTION

A method and system for evaluating and sharing media files are disclosed. According to one embodiment, a computer networking system for generating scores for media files in four steps and calculating the total score for each of the four steps. The scores are calculated based on votes from users for each media file, overall views of each media file and the referral ratio for each media file. The votes are generated using questions and recommendations.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

This system may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The present invention also relates to methods for performing the operations herein.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1:
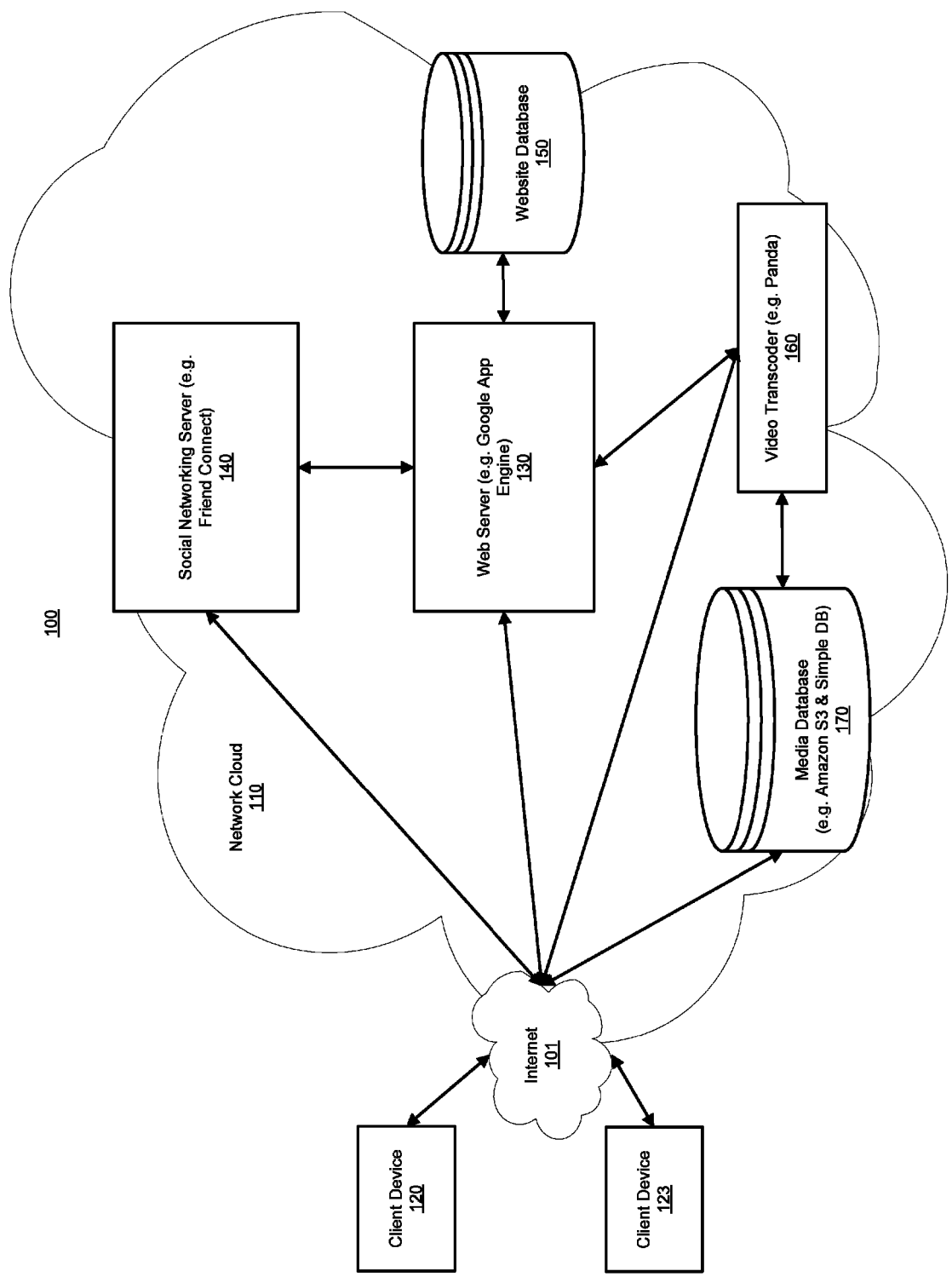
FIG. 1 illustrates a block diagram of an exemplary network framework for use with the present system, according to one embodiment.

FIG. 1 illustrates a block diagram of an exemplary network framework for use with the present system, according to one embodiment. System 100 includes clients devices 120 and 123, web server 130 with at least one database 150, social networking server 140, video transcoder 160, and media database 170.

System 100 is interconnected by the internet 101, and network cloud 110. According to one embodiment, network cloud 110 is described as being the Internet, alternatively, network cloud 110 may be a Wide Area Network (WAN), a Local Area Network (LAN), or any other system of interconnections enabling two or more devices to exchange information. Components within the network cloud 110 may be virtual and run completely in a cloud computing environment.

One or more of client devices 120 and 123, may allow network access via a web browser such as MICROSOFT'S INTERNET EXPLORER, NETSCAPE BROWSER, MOZILLA, FIREFOX, or the APPLE's SAFARI browsers that support HTML and JavaScript. The preferred browsers are Internet Explorer, Firefox, or Google Chrome. Client devices may also allow network access via dedicated application. Clients devices 120 or 123 may be fixed devices such as set top boxes, desktop computers, media recorders such as those manufactured by TiVo, Inc. of Alviso, Calif., game devices such as the XBox manufactured by Microsoft, Corp. of Redmond, Wash. or similar devices. Additionally, client devices 120 or 123 may be mobile devices, such as videophones, laptops, smart phones, mobile phones, PDAs, game devices such as the PSP manufactured by Sony Electronics, multimedia devices such as iPods, iPads and iPhones manufactured by Apple Computers of Cupertino, Calif., or similar devices.

Web server 130 is a web server that uses any one of a number of protocols and/or applications including HyperText Transfer Protocol (HTTP), File Transfer Protocol (FTP), Internet Relay Chat (IRC), etc., via a TCP/IP connection (not shown in this view) or other similar connection protocols. The operating system may be Windows, LINUX, SUN Solaris, Mac OS, or other similar operating system. In one embodiment, the web server 130 is a dedicated server. It uses processing logic, tools and databases and is built using a combination of technologies such as those from Apache Software (www.apache.org) such as Tomcat servers; Java based technologies such as J2EE, EJB, JBOSS, JDBC; and/or databases such as MySQL. According to one embodiment, web server 130 may be a server such as Windows server or Linux server. Web server 130 hosts website engine for the present system which allows users with user accounts to access web applications to upload media files, enter metadata, answer questions and make recommendations.

Website database 150 is a scalable database for storing metadata (e.g. Google App Engine Database). According to one embodiment, website database 150 store media metadata. Website database 150 may also store client metadata.

Social networking server 140 allows users of client devices 120 and 123 to create a profile and invite friends and family to join their social network (e.g. Google friend connect, Facebook, or twitter). According to one embodiment, Social networking server 140 authenticates client login for web server 130. Users with user accounts on social networking server 140 are able to access voting and uploading features of system 100. For example, when a client device attempts to access member only features, server 130 directs client device to social networking server for login. Social networking server may also store client metadata, according to one embodiment.

Video transcoder 160 handles uploading and encoding of media from client device 120 or 123, according to one embodiment. When a client wishes to upload a video, web server 130 directs client device 120 or 123 to video transcoder. Once media is uploaded and encoded, video transcoder 160 stores media in media database 170 and notifies web server 130. Alternatively, media database 170 notifies web server 130 when media is uploaded. Video transcoder may operate on a dedicated server or series of dedicated servers. Alternatively, video transcoder 160 may operate through web server 130. In the preferred embodiment video transcoder operates in a cloud computing environment (e.g. Panda operating on Amazon EC2).

Media database 170 stores all media uploaded by clients. According to one embodiment, media stored on media database 170 is viewable directly from media database 170. Media database may operate on a file hosting service. In the preferred embodiment, media database operates in a cloud computing environment (e.g. Amazon's S3 and SimpleDB).

System 100 may include multiple servers similar to website server 130 that host various websites. System 100 may also include other supporting computing software and hardware, for example, additional website servers, databases, computers, and user interface servers.

Figure 2:
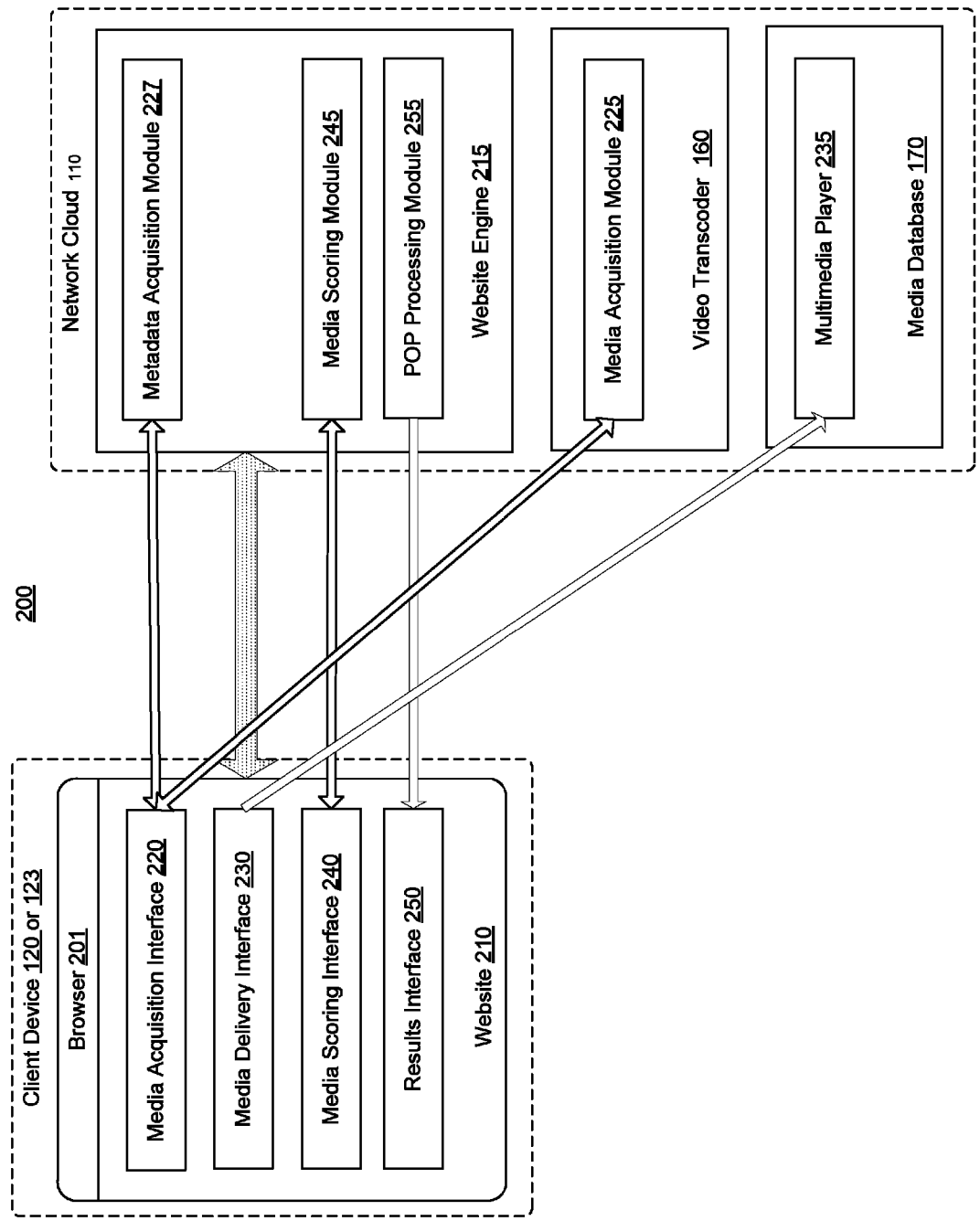
FIG. 2 illustrates a block diagram of an exemplary media evaluating and sharing system, according to one embodiment.

FIG. 2 illustrates a block diagram of an exemplary media evaluating and sharing system, according to one embodiment. Website Engine 215 operates in network cloud 110. According to one embodiment, website engine 215 is hosted by web server 130. Website engine 215 may also be virtualized across a plurality of host servers. Website engine 215 contains multiple software modules including metadata acquisition module 227, media scoring module 245, and POP processing module 255. According to one embodiment, modules 227, 245, 255 may be APIs or Web applications (e.g. web applications operating in Google App Engine). Social networking platform 145 resides on social networking server 140 in network cloud 110. According to one embodiment, social networking platform 145 and website engine 215 reside on the same server(s). Social networking platform 145 may be a third party platform such as Google friend connect, Facebook, or Twitter, or it may a proprietary social networking platform. In addition, the system may be configured to operate with a plurality of social networking platform(s) 145.

Media acquisition module 225 resides on video transcoder 160 in network cloud 110. According to one embodiment, media acquisition module 225 may be an API of video transcoder 160 (e.g. Panda operating on Amazon's EC2).

Multimedia player 235 resides on Media database 170 in network cloud 110 and plays media directly from media database 170, according to one embodiment.

Browser 201 resides on client devices 120 and 123, and facilitates access to website 210 for present system. Browser 201 is an application that uses any one of a number of protocols including HyperText Transfer Protocol (HTTP), File Transfer Protocol (FTP), Internet Relay Chat (IRC), etc., via a TCP/IP connection (not shown in this view) or other similar connection protocols. Browser 201 may be a web browser such as Microsoft Internet Explorer, Mozilla, Apple Safari, Firefox, Google Chrome, etc. In one embodiment, browser 201 is a dedicated web client interface (e.g. iPhone or Android app) for system 200.

When a user accesses website 210 through browser 201, user is presented with a number of interfaces which are rendered by website engine 215. According to one embodiment, the interfaces include media acquisition interface 220, media delivery interface 230, media scoring interface 240, and results interface 250. These interfaces may be generated using well known techniques such as AJAX (Asynchronous JavaScript and XML).

Interfaces 220, 230, 240, and 250 interact with modules 225, 227, 235, 245, and 255, and allow for system 200 functionality.

Media acquisition interface 220 allows clients to upload media and media metadata. Media from media acquisition interface uploads to media acquisition module 225 in video transcoder 160, and metadata uploads to metadata acquisition module 227. In another embodiment of the present system, media and media metadata upload to the media acquisition module 225. Media acquisition interface displays a form or series of forms for client to enter media information such as title and people involved in production.

Media delivery interface 230 allows clients to view media on media database 170. According to one embodiment client-side media delivery interface 230 allows client to view media directly from host-side media player 235. Media delivery interface 230 may also contain a media information interface with all metadata user uploaded with video. Further media delivery interface 230 allows user to control media playback of video. In another embodiment, a media referral/share interface is contained within media delivery interface 230. This interface consists of ways to share video with members' contacts by e-mail forwarding, posting to a website such as MySpace, Facebook, twitter or listing on a referral website such as Digg.com, etc.

Media scoring interface 240 allows clients to answer questions and recommend media (sample questions can be found at FIG. 14). Client answers and recommendations are forwarded to media scoring module 245 for processing.

Results interface 250 displays sorted lists of media scored by POP processing module 255.

In one embodiment, the system utilizes a video detail page which contains the media delivery interface 230, a media scoring interface 240 and a results interface 250. Interfaces 240, and 250 may also all be contained within the framework of 230 that is within the framework of website 210.

Figure 3A:
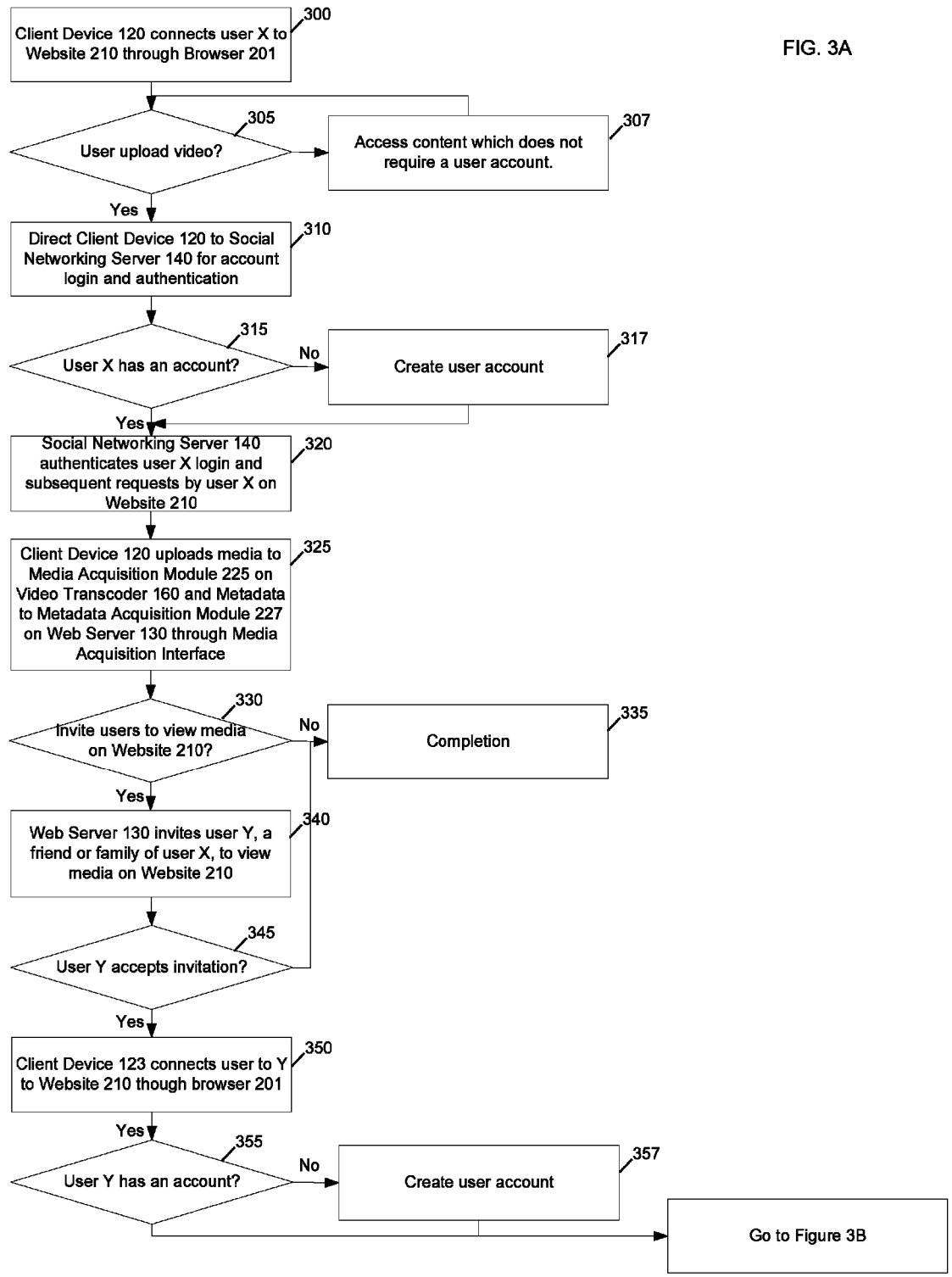
FIGS. 3a and 3b illustrates a flow diagram of an exemplary overall process for use with the present system, according to one embodiment.
Figure 3B:
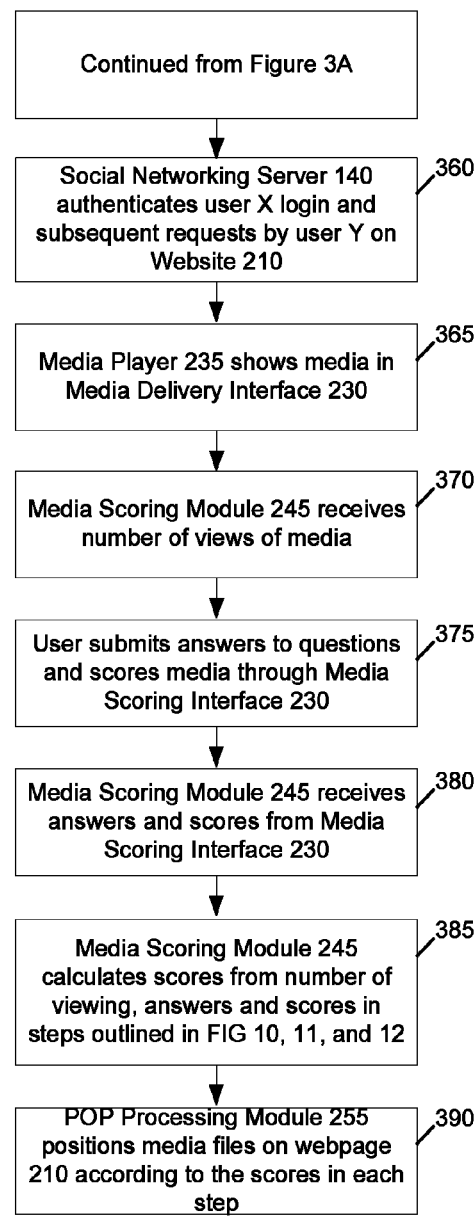

FIGS. 3*a* and 3*b* illustrate a flow diagram of an exemplary overall process for use with the present system, according to one embodiment.

A user account is created for any users before uploading media or voting on any media. Client device 120 connects a user X to website 210 (300). Website 210 may be wwww.digipops.tv. In one embodiment, user X may simply want to view media available, no user account is required (307). In another embodiment, social networking server 140 creates a required user account for user X (317) as user X intends to submit content. Once user X logs into user account, social networking server 140 authenticates user X's login and subsequent requests by user X on Website 210 (320). For example, social networking server 140 may proxy user's client credentials when user uploads media, or votes on media. According to one embodiment, social networking server 140 forwards user X's client metadata to web server 130.

Through media acquisition interface 220 on client device 120, user X uploads a media file A and inputs metadata associated with media file A (325). Media file A uploads to media acquisition module 225 on video transcoder 160 and media file A metadata uploads to metadata acquisition module 227 in website engine 215. For example, when user X initiates an uploading, website engine 215 may request a unique video ID from video transcoder 160 for the new media file and direct client device to video transcoder 160 with video ID to upload media. In another embodiment, both media file and media file metadata upload to media acquisition module 225. In yet another embodiment, user X enters media file metadata after media file uploads to media acquisition module 225.

After media file A is uploaded, user X is given the option of inviting friends and family to view media file A (330). Through website 210, user X sends invitations to view media file A to friends and family, such as user Y (340). According to one embodiment, user X may invite anyone who he or she is already friends with through social networking platform 243 on social networking server 140 (e.g. friend list in Google friend connect, Facebook, Twitter, etc.). User X may also invite persons who do not have a user account on social networking server 140 to view media file A by submitting their emails. Invitations to view and vote on media are sent to invitees' email, social networking account inbox, and/or website 210 user account.

User Y is connected to system 100 through client device 123. User Y receives an invitation to view media file A from user X or another user. By clicking the link or an icon attached to the invitation (345), user Y is prompted by server 130 to create account for himself. If user Y accepts invitation, then client device 123 connects user Y to website 210 through browser 201 (350). As discussed previously, in one embodiment, user Y must create a user account to vote on the quality of the media (355, 357). Client device 123 is directed to social networking server 140 for account creation (357). After user Y's login is authenticated (360), user Y may view user X's media file or user Y may choose to upload his or her own media file(s) and invite friends and family to view (i.e., steps 325-340). If user Y chooses to view media file A then he or she is presented with media delivery interface 230 and he or she can send instructions to view media file A. Alternatively, user Y is already logged into social networking server 140 through client device 123. After clicking the link or icon attached to the invitation (345), user Y is directed to the media delivery interface 230 directly (365). If user Y is not logged into social networking server 140 but already has a user account, client device 123 is directed to social networking server 140 for account login and authentication (355). User Y's login is authenticated (360) and user Y may view media file A through media delivery interface 230 (365).

In another embodiment, user Y is an existing website 210 user but he does not receive any invitation from any other users. User Y may be browsing the list of the media available on website 210, and see that media A has received a high score and is positioned high or being awarded on Results Interface 250. User Y may decide to view media file A by clicking an icon or link next to media file A's representation on the Results Interface 250. If user Y is not an existing website 210 user, and if user Y wants to vote on a media A, recently uploaded by user X, user Y is required to have a user account. User Y may set up his own user account through client device 123 on website 210. According to another embodiment user Y is not required to set up a user account in order to vote. Further, user may be presented with a request to vote concurrently with the viewing of media file A or subsequent to the viewing of media file A.

In one embodiment, user X sends user Y an invitation to view and vote on user X's video through a pre-designed template available for entering information and editing of information already pre-populated. For example, who the invite is from, what media file A is about, why media file A has been submitted, when link will expire, who the recipients of the invitation are, etc.

In one embodiment, the submitter of a media file, such as user X, may grant team members who helped making the media the right to invite other users to view and vote on the quality of the media. User X may grant the other team members the same level of rights or a lower level of rights subjected to his or her control. For example, invitations sent by other team members may require approval from the submitter. This way, submitter of a media may retain control but expand the invitations that can be sent out.

Once user Y views media file A, media scoring module 245 updates the total number of views of media file A (370). User Y then answers scaled questions, evaluates pop-to-drop ratio, and/or makes recommendations to score media file A through media scoring interface 240 (375). User Y may also submit comments which may also be used to score media file A. Media scoring module 245 receives such information from media scoring interface 240 and stores scored answers, pop-to-drop ratio, recommendations and comments for media file A on website database 150 residing on or associated with web server 130 (380). According to one embodiment, media scoring module 245 calculates the total scores of media file A in four phases and stores scores for each phase on website database 150 (385). POP processing module 255 positions media file A on results interface 250 on website 210, based on the scores in each of the four phases (390).

The four phases of calculating the overall score of a media file are the initial release (nascent phase), the adolescent phase, adult phase, and finals phase. Each phase corresponds to a page which displays the ranking of media file submissions. These phases are described in detail in FIGS. 8, 9, 10, 11 respectively.

Figure 4:
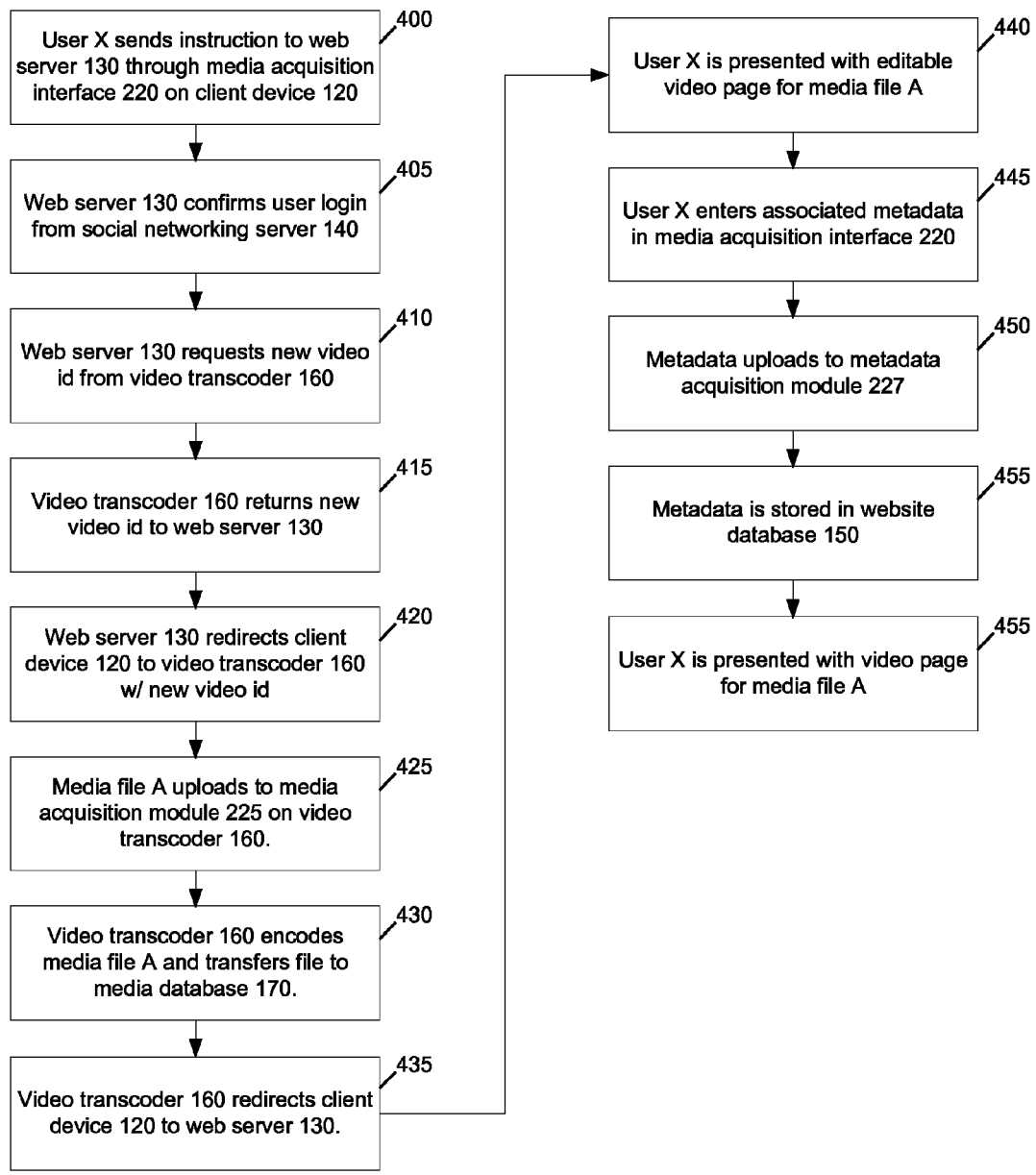
FIG. 4 illustrates a flow diagram of an exemplary process for submitting a media file according to one embodiment.

FIG. 4 illustrates a flow diagram of an exemplary process for sharing and evaluating a user-generated media file with other users, according to another embodiment. The steps described in FIG. 4 are basically the details that take place behind steps 320 to 325, which describe generally uploading media file, sending invitation to other users, and other users accessing media file.

To upload media file A and associated metadata, user X sends an instruction to server 130 from client device 120 through media acquisition interface 220 (400). Web server 130 confirms user login from social networking server 140 (405), and requests new video id from video transcoder 160 (410). Once, video transcoder 160 returns new video id to web server 130 (415), web server 130 redirects client device 120 to video transcoder 160 with new video id (420). Client device 120 establishes a connection with video transcoder 160 and media file A uploads to media acquisition module 225 on video transcoder 160 (425). Once upload is complete, video transcoder 160 redirects client device 120 to web server 130 (435), and video transcoder 160 encodes media file A out of band, and transfers the file to media database 170 (430). User X is presented with editable video page for media file A (440) and enters associated metadata in media acquisition interface 220 (445). For example, user enters production information like title, running time of media file A and cast and crew involved in production of media file A. Metadata for media file A is then uploaded to metadata acquisition module 227 (450) and stored in website database 150 (455). User X is presented with video page for media file A along with associated metadata. According to one embodiment, user X may edit media file A metadata at anytime.

Figure 5:
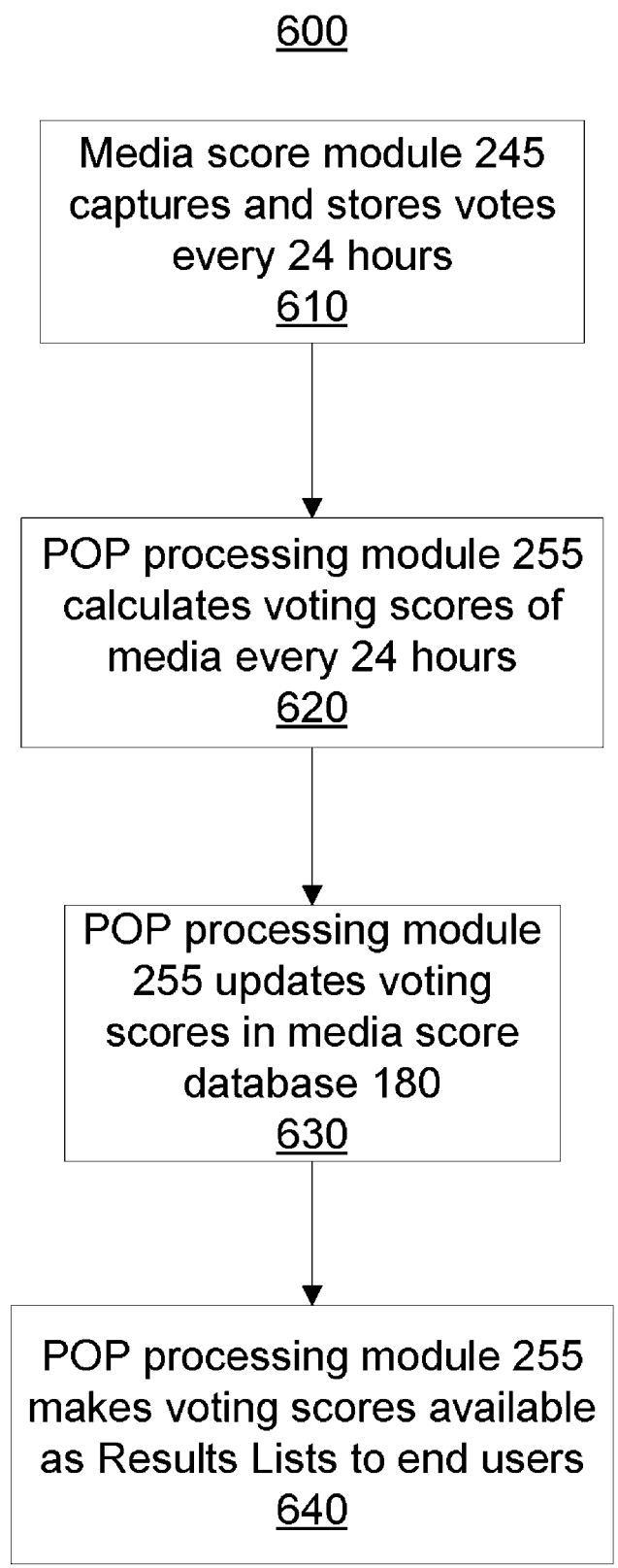
FIG. 5 illustrates a flow diagram of an exemplary process for recording and calculating scores for a media file and presenting the scores on a Results List, according to one embodiment.

FIG. 5 illustrates a flow diagram of an exemplary process for recording and calculating scores for a media file and presenting the scores on a Results List (which is presented as a webpage during different phases of the contest/festival) according to one embodiment. In this embodiment, the media scoring module 245 captures the scaled answers, pop-to-drop ratio, recommendations, and comments from users on each media file, and the number of views of each media in realtime or a preset time, for example, in realtime or by preset time (610). POP processing module 255 calculates voting scores of media after the numbers and answers are updated by media scoring module 245 (620). POP processing module 255 updates voting scores in media score database 180 (630). POP processing module gets calculated scores from media scoring module 245 and positions media on results interface 250 on website 210 (640) based on current overall score. POP processing module 255 makes the calculated scores available as results lists to end users, preferably on the results interface 250 on website 210 (640). The same score is shown on the Results Interface 250 in real-time or a preset time. This information is stored in website database 150.

Figure 6:
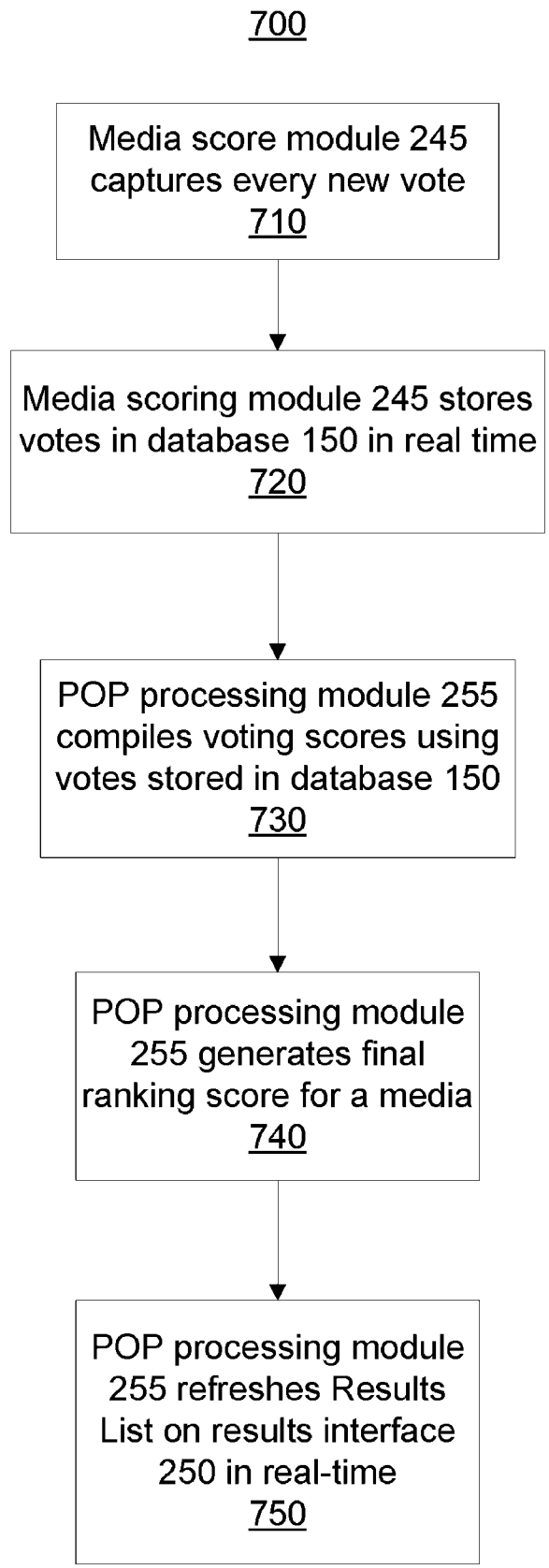
FIG. 6 illustrates a flow diagram of another exemplary process for recording and calculating scores for a media file and presenting the scores on a Results List, according to one embodiment.

FIG. 6 illustrates an alternative embodiment of the flow diagram of FIG. 5 where the scores are calculated in real time.

Figure 7:
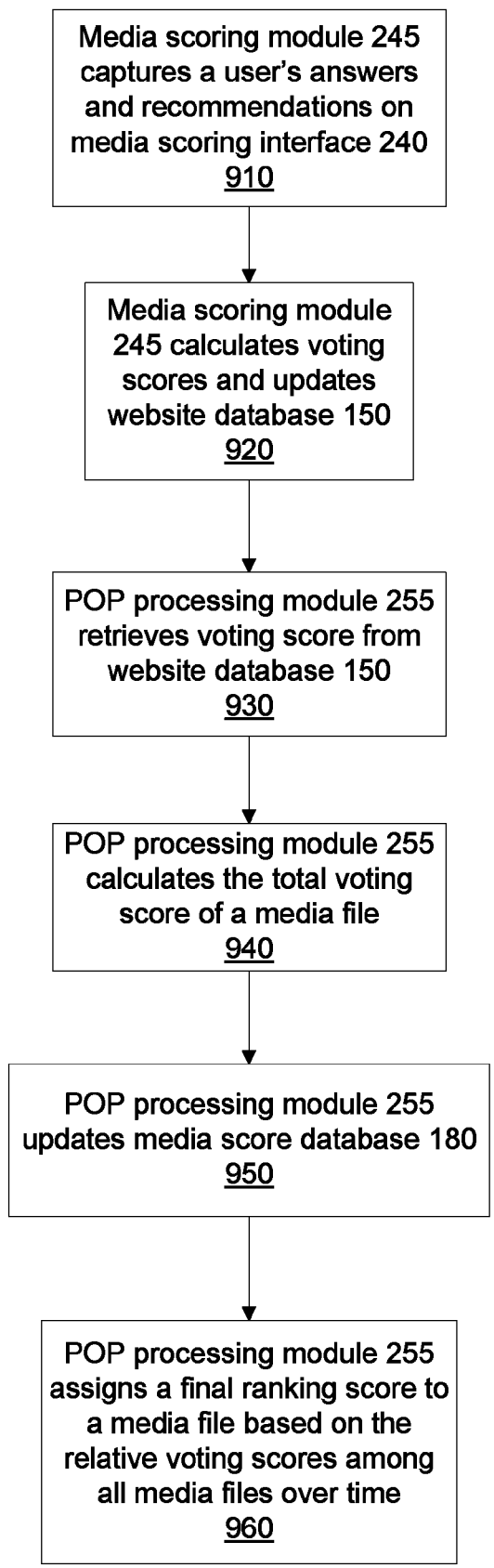
FIG. 7 illustrates a flow diagram of an exemplary process for generating scores for a media file using answers and recommendations entered by users, and the overall viewing numbers according to one embodiment.

FIG. 7 illustrates a flow diagram of an exemplary process for generating scores for a media file using scaled answers, pop-to-drop ratio, percentage of video viewed, comments, social distribution, and recommendation entered by users, and the overall views and generating the final scores according to one embodiment. The process for calculating the scores can be divided into four phases, and each phase is described in further detail in FIG. 8, FIG. 9, FIG. 10, and FIG. 11 respectively. The overall process of calculating scores based on scaled answers, pop-to-drop ratio, percentage of video viewed, comments, social distribution, recommendations, and number of views starts with a user answering questions on media file and making recommendations on media scoring interface 240 of the website 210 (910). Answers are in response to specific questions. A user may make a recommendation to "POP" or "DROP" a media file after viewing. In one embodiment, a user must answer at least 80% of all the questions before the user can submit his input or recommendation. The number of views is the total times a particular media was viewed by users. A media receives higher scores when more users view the media. In one embodiment, users may only vote for a particular submission once per phase, but may vote for the same submission if it moves on to subsequent phases. In another embodiment, all viewings, no matter which user they come from, are considered in the calculation of the total number of views.

In another embodiment, the percentage of a media file viewed is used to factor in determining the score of the media files. The percentage can be used to scale any one or more other scores such as the scaled answers, pop-to-drop ratio, recommendations, and/or overall views. For instance, if a viewer scores a file perfectly for 100, but only viewed 80% of the media file, then the score would by scaled to the viewed percentage of 80%. Thus, the actual score is only 80. Again, this scaling can be used for any other scoring criteria and should not be limited to the embodiment described herein.

The answers and recommendations are captured to media scoring module 245 (910) which also tracks the number of views by users. The media scoring module 245 calculates a voting score for each media file based on the scaled answers, pop-to-drop ratio, percentage of video viewed, comments, social distribution, recommendations and number of views, and updates the website database 150 (920). According to one embodiment, fifty-percent of the scaled answers are based on answers to questions about the creative merit of the submission and fifty-percent is based on answers to questions about the technical merit of the submission. Those skilled in the art will recognize other ways of scaling answers to the merits of a submission. In addition, according to one embodiment, scaled answers, pop-to-drop ratio, number of views, percentage of video viewed, comments, social distribution, and recommendation are each weighted equally in tallying the voting score. According to another embodiment, only scaled answers, pop-to-drop ratio and number of views factored into the voting score and comments/reviews are used in the event of a tie. As described in FIG. 7, the media scoring module 245 calculates the total voting score of a media file (940) either in real-time, or a preset time, and updates media scores in the media score database 180 (950). Media scoring module 245 then assigns a final ranking score to the media file on the results interface 250, based on the relative voting scores among all media files over time (960). Process in FIG. 7 is repeated per media file.

Figure 8:
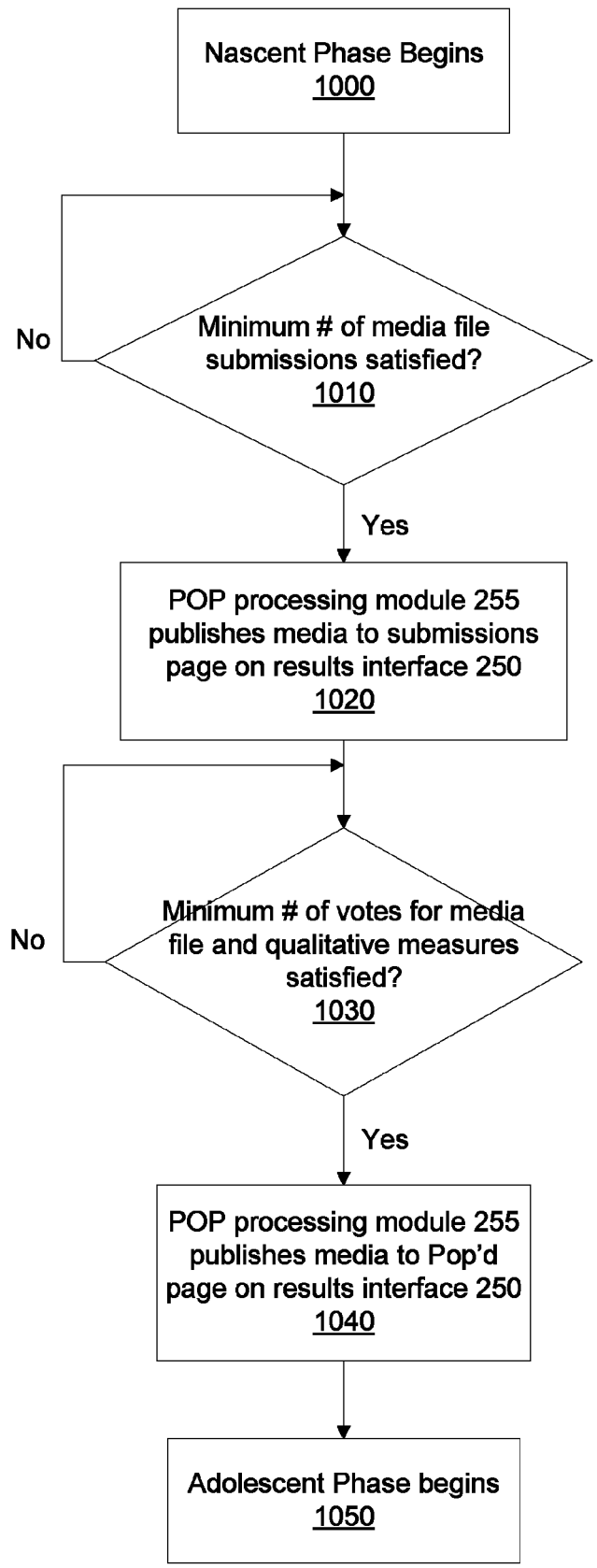
FIG. 8 illustrates a flow diagram of an exemplary process of the first step for positioning a media file on a website based on the scores it receives, according to one embodiment.

FIG. 8 illustrates a flow diagram of an exemplary process of the first step or nascent phase for positioning a media file on a website based on the scores it receives, according to one embodiment. At the nascent phase, the media scoring module 245 determines whether the number of media file submissions meets the threshold number of media submissions (1010). The threshold number of media submissions may be a preset number determined by the festival planners or an adjustable number determined by number of entries over a given period of time. If the minimum number of media file submissions is satisfied, the POP processing module 255 publishes media to submissions page on results interface 250 (1020). If the minimum number of media submissions is not satisfied, none of the submissions are published. According to one embodiment, when the minimum number of media submissions is not satisfied after a fixed time, the festival is rescheduled. Once the minimum number of media file submissions is satisfied and the media file is published to the submissions page, the POP processing module 255 determines whether the media file gained the minimum number of votes and whether the media file meets the qualitative measures as a result of the voting (1030). The media scoring module 245 makes the determination in either real-time or a preset time. If the media file satisfies both criteria, then the POP processing module 255 publishes the media file to the Pop'd page on results interface 250 (1040). This begins the adolescent phase (1050).

In one embodiment, the initial homepage for the website before the start of a contest/festival will contain only descriptive information about how the contest or festival works, rules, and an exemplary timeline. However, once there have been enough submissions to start a contest/festival, the initial homepage is changed to feature the submissions or Pop'd page showing media files that are in the adolescent phase. Subsequently, the homepage will change depending on the phase of the contest/festival. In one embodiment, the Results Interface 250 places the published media files at random on a page, without consideration to ranking. This is done so as to eliminate voting bias.

Figure 9:
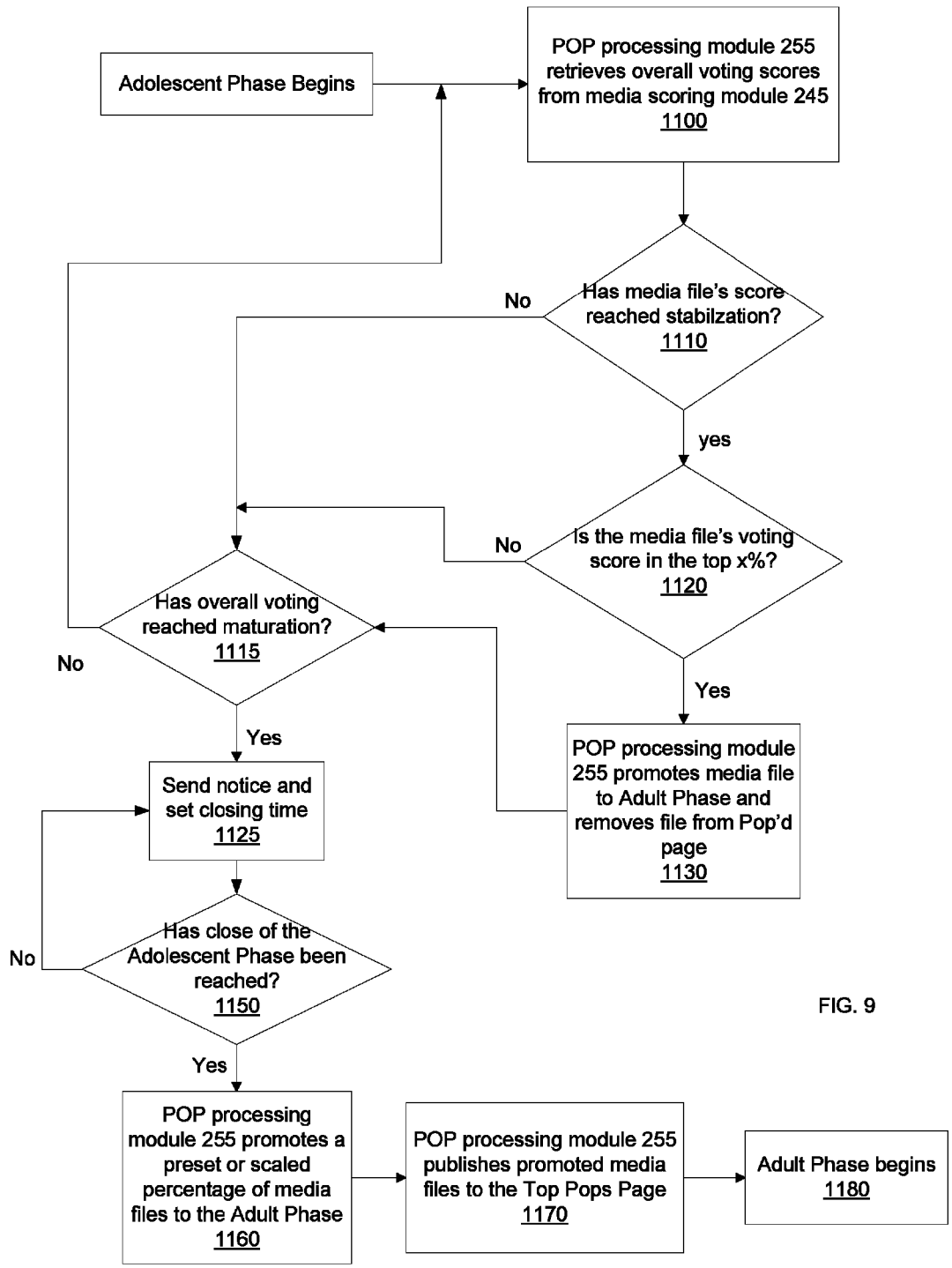
FIG. 9 illustrates a flow diagram of an exemplary process of the second step for positioning a media file on a website based on the scores it receives, according to one embodiment.
Figure 10:
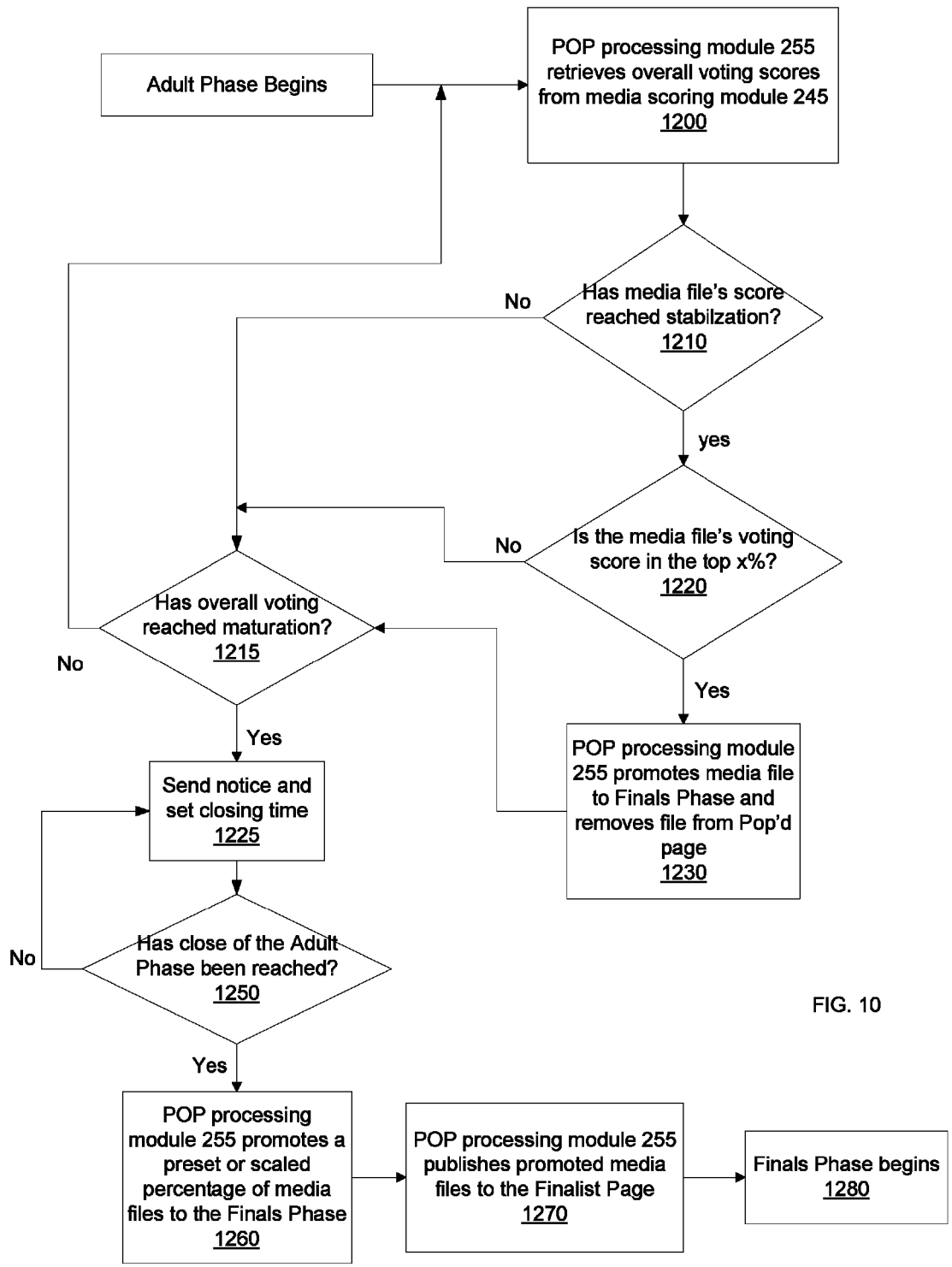
FIG. 10 illustrates a flow diagram of an exemplary process of the third step for positioning a media file on a website based on the scores it receives, according to one embodiment.
Figure 11:
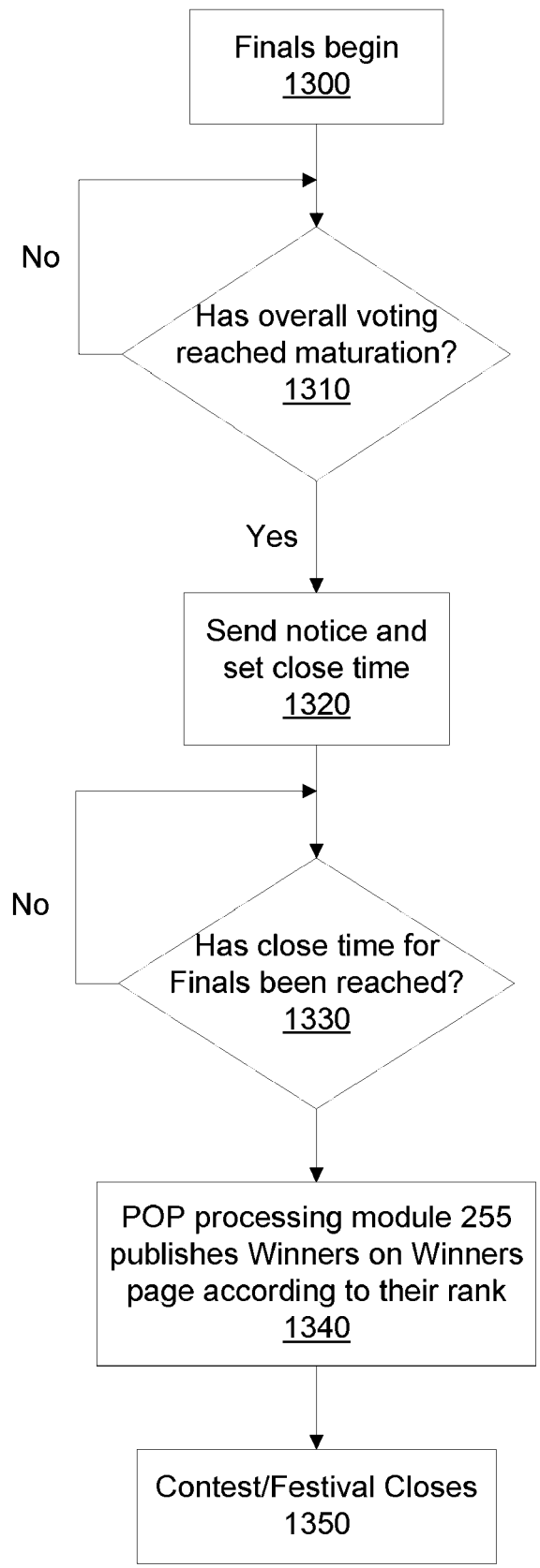
FIG. 11 illustrates a flow diagram of an exemplary process of the fourth step for positioning a media file on a website and generating scores for a media file using answers and recommendations entered by users and updating the scores in a database, according to one embodiment.

FIGS. 9, 10, and 11 illustrate flow diagrams of an exemplary process of transitioning from the adolescent phase to finals. Once submissions have been published to the submissions page, moving from the adolescent phase to adult phase, and adult phase to finals is determined by the stabilization of the media file's total voting score in each phase and/or the maturation of voting across all remaining submissions.

Promoting a Media File from One Phase to the Next:

The highest ranked media file submissions are promoted to the subsequent phase prior to close of the active phase. After a period of ranking media files in the active phase, the media files with the highest total voting score emerge at the top of the page.

Voting Stabilization:

Voting stabilization occurs when the number of votes for a media file may increase but the total voting score tapers to an average value. Stated another way, stabilization occurs when the variance in the score reaches a minimum amount. Once this occurs, the system checks whether the voting score is at a top X percentage (i.e. 1%, 5%, or 10%) and promotes the file to the next phase and removes the file from the current phase page. This is done to address the presence of viral or hit files that are certain to progress to the next phase and take up slots on a certain phase page. Removing the files that are certain to be promoted to the next phase allows for other files to gain traction as well as keeping the current phase page fresh and appealing to visitors. The exact time it takes for a score to stabilize varies by media file and timing. For example, some media files attract more attention as time goes on so it may take longer for the score to stabilize.

The remaining media files appear on the page of the active phase until voting across all the media files in the active phase reaches maturation. Voting maturation for the active phase is assessed as a function of the total number of votes for all remaining submissions over time.

Voting Maturation:

Voting maturation occurs when voting for an active phase is said to be mature. The voting patterns for a contest/festival mimics a bell curve where initially the number of votes is small, but steadily builds as more people become aware of the media file submissions, either by invite or from use of the website. The rise in votes will eventually plateau as the critical mass of users has voted. When this occurs, the votes will begin to taper off and voting is said to have reached maturation. Once maturation has been reached, users who have made submissions are given notice that the active phase will close at a fixed time. This is done to encourage users to promote their submission and encourage friends and family to view and vote thus driving more traffic onto the site.

Once the fixed time has been reached, the active phase closes. A preset or scaled percentage of media file submissions are promoted to the next phase and are published on the next phase's page (or Results List) along with the media files that were promoted prior to maturation. The next phase thus becomes the new active phase and the process is repeated. Users may vote again for the same media file in the new active phase.

FIG. 9 illustrates a flow diagram of the process of assessing stabilization of a media file's total voting score and the maturation of voting across all remaining submissions during the adolescent phase. The POP processing module 255 retrieves overall voting scores from media scoring module 245 (1100) and checks whether the media file's score has reached stabilization (1110). If stabilization has been reached by the media file, the POP processing module 255 determines whether the media file's voting score is in the top 1%, 5% or 10% of all submissions in the adolescent phase (1120). If the medial file's voting score is in the top x %, then the POP processing module 255 promotes the media file to the adult phase (1130) and removes the media file from the current phase page (i.e. Pop'd page) so that other media files can get exposure. The media file is removed from the Pop'd page and added to the Top Pops page, however, the Top Pops page is not published until close of the adolescent phase. The owner and all team members of the media are notified with a congratulatory notice informing them that their video has been advanced to the next phase.

However, if the media file's voting score has not reached stabilization or the media file is not in the top x %, then the Pop process module checks to see if overall voting has reached maturation for the adolescent phase (1115). If maturation has not occurred, the POP processing module 255 continues to retrieve overall voting scores from media scoring module 245 and determines whether any of the media files have reached stabilization. When maturation occurs, a closing time for the adolescent phase is set and notification messages are sent to all users with a submission still in the adolescent phase informing them when the adolescent phase will close (1125). Ideally, users with submissions on the Pop'd page will make a last ditch effort to promote their submissions and sustain voting. Once a closing time has been set for the adolescent phase, no additional media file submissions may be promoted to the adult phase until the adolescent phase closes. Once the closing time has been reached, the POP processing module 255 promotes a preset or scaled percentage of the media files to the adult phase (1160) and then publishes the all the promoted media files to the Top Pops Page (1170).

FIG. 10 illustrates a flow diagram of the process of assessing stabilization or a multimedia file's total voting score and maturation of voting across all remaining submissions during the adult phase. The process repeats the same analysis as the one performed in the prior phase. Qualifying files are promoted to the Finals phase and published to a Finalists page.

FIG. 11 illustrates the flow diagram for the Finals phase of the contest/festival. The Finals phase is the last phase of the festival and thus there is no need for a stabilization analysis since the media files are not being promoted to a next phase. The POP processing module needs only to continue to collect and tally votes while determining whether voting has reached maturation (1310). Once voting has reached maturation, notifications are sent out to all users with a media file in the Finals phase and a contest/festival close time is set (1320). Voting is collected until the close time has been reached (1330) at which point, the POP processing module 255 makes a final determination of scores and publishes the winners on a Winners page (1340).

FIG. 12 illustrates an exemplary question set for a media file for users to answer, according to one embodiment. What is shown is an example of the media scoring interface 240, after a user has viewed a media file. A user is asked five artistic questions on authenticity, creativity, passion, thoughtfulness, and rhythm. The answers range from very bad, bad, neutral, good, and very good. For each question, the answers may be formatted differently to reflect the question more accurately. For example, a question on thoughtfulness may have answers ranging from brainless to brilliant or on a numerical point scale.

A user is also asked five technical questions on the technical quality of the media including production quality, cinematography, sound quality, music, and editing. The answers similarly range from very bad to very good or a numerical point scale, with variations according to the different questions asked.

A user is also asked to flag any indecent media to alert the administrator that the media should be labeled as adult only or should be removed from the system. In addition, a user is asked to make a recommendation on a media. Any user who recommends a media is also prompted to send the link of this media to friends and family members. Moreover, any user who wants to make comments on a media may do so by entering the comments in a text box on the media scoring interface 240.

For a user who submits a media to be viewed and evaluated by others, it is potentially to his advantage to have more people viewing and evaluating his media so he can receive sufficient entries of scores to be positioned on a phase page or Results List. This user has the option of inviting many friends and family members to view and evaluate his media submitted to the system.

A method and system for determining and sharing a user's web presence has been described. It is understood that the embodiments described herein are for the purpose of elucidation and should not be considered limiting the subject matter of the present disclosure. Various modifications, uses, substitutions, combinations, improvements, methods of productions without departing from the scope or spirit of the present disclosure would be evident to a person skilled in the art.

I claim:

1. A method for promoting discovery of media files in a list of media files displayed on a website based on user activity during progressive phases of a contest, the method comprising:

publishing a media file on a restricted rights page during a nascent phase of the contest;

calculating a preliminary score for the media file based on an authorized viewer vote count and an authorized user scores for the media file;

publishing the media file on an adolescent phase page, accessible to the public, if the preliminary score for the media file meets a predetermined criteria thereby entering an adolescent phase of the contest;

calculating the media file's score based on a combination of results that users provide to a qualitative questionnaire and the media file's user activity comprising tallies of user voting, viewing, sharing, liking, and disliking of the media file;

determining whether the score for a selected media file has reached stabilization; wherein stabilization occurs when a variance in the score for the selected media file reaches a minimum preselected amount for the adolescent phase;

if the score for the selected media file has reached stabilization, determining whether the score exceeds a preset percentage and if the score for the selected media file exceeds a preset percentage, removing the selected media file from the adolescent phase page to promote discovery of other non-promoted media files in the adolescent phase and advancing the selected media file to an adult phase of the contest;
determining whether voting for all media files not advanced in the adolescent phase has reached maturation by detecting when a rate for voting for all media files not advanced in the adolescent phase decreases;
sending notice to a media owner if maturation is reached and setting a close time for the adolescent phase;
determining whether the close time for the adolescent phase has been reached;
calculating a final score for each of the media files not advanced in the adolescent phase based on a combination of results users provide to the qualitative questionnaire and the media file's user activity comprising tallies of user voting, viewing, sharing, liking, and disliking of the selected media file; and
determining top scoring not advanced media files of the adolescent phase by comparing the media file scores of all media files in the adolescent phase and advancing the top scoring media files to the adult phase of the contest;
publishing the top scoring media files from the adolescent phase on an adult phase page;
calculating a selected adult phase media file's score based on a combination of results users provide to the qualitative questionnaire and the media file's user activity comprising tallies of user voting, viewing, sharing, liking, and disliking of the selected media file;
determining whether the score for the selected adult phase media file has reached stabilization; wherein stabilization occurs when a variance in a score for the selected adult phase media file reaches a minimum preselected amount for the adult phase;
if the score for the selected adult phase media file has reached stabilization, determining whether the score exceeds a preset percentage for the adult phase and
if the score for the selected media file exceeds the preset percentage,
removing the selected media file from the adult phase page to promote discovery of other non-promoted media files and
advancing the selected media file to a finals phase of the contest;
determining whether voting for all media files not advanced the adult phase has reached maturation by detecting when a rate for voting for all media files not advanced the adult phase decreases;
if maturation is reached
sending notice to the media owners and
setting a close time for the adult phase;
determining whether the close time for the adult phase has been reached;
calculating a final score for each of the media files in the adult phase based on a combination of results users provide to the qualitative questionnaire and the media file's user activity comprising tallies of user voting, viewing, sharing, liking and disliking of the selected media file; and
determining top scoring media files of the adult phase by comparing the media file scores of all media files in the adult phase and advancing the top scoring adult phase media files to the finals phase of the contest;
publishing the top scoring media files from the adult phase on a finals phase page;
calculating a selected finals phase media file's score based on a combination of the results users provide to the qualitative questionnaire and the media file's user activity comprising tallies of user voting, viewing, sharing, liking, and disliking of the selected media file;
determining whether voting all media files for the finals phase has reached maturation by detecting when a rate for voting for all media files of the finals phase decreases;
if maturation has been reached,
sending notice to the media owner and setting a close time for the finals phase;
determining whether the close time for the finals phase has been reached;
calculating a final score for each of the media files in the finals phase based on a combination of the results users provide to the qualitative questionnaire and the media file's user activity comprising tallies of user voting, viewing, sharing, liking, and disliking of the selected media file;
determining a top scoring media file for the finals phase; and publishing the top scoring media file on a winners page.

2. The method of claim 1, wherein part of the media file's score is scaled based on a percentage of the video viewed.

3. The method of claim 1, wherein the results to the questionnaire are scaled by a total number of votes.

* * * * *